Feb. 16, 1965  E. SARAPUU  3,169,577
ELECTROLINKING BY IMPULSE VOLTAGES
Filed July 7, 1960  2 Sheets-Sheet 1

INVENTOR.
Erich Sarapuu
BY
ATTORNEY.

Feb. 16, 1965  E. SARAPUU  3,169,577
ELECTROLINKING BY IMPULSE VOLTAGES
Filed July 7, 1960  2 Sheets-Sheet 2

INVENTOR.
Erich Sarapuu
BY
ATTORNEY.

United States Patent Office 3,169,577
Patented Feb. 16, 1965

3,169,577
ELECTROLINKING BY IMPULSE VOLTAGES
Erich Sarapuu, Kansas City, Mo., assignor to Electrofrac Corporation, a corporation of Delaware
Filed July 7, 1960, Ser. No. 41,418
10 Claims. (Cl. 166—42)

This invention relates to means of linking underground electrodes, one to another, by electrical impulses and refers more particularly to such methods employing surge generating techniques.

This invention is an improvement of the process and apparatus disclosed in the patent to E. Sarapuu, No. 2,795,279, issued June 11, 1957, for "Method of Underground Electrolinking and Electrocarbonization of Mineral Fuels."

An object of the invention is to provide methods of electrically linking one underground electrode to another through an oil bearing layer by electrical impulses in such manner as to make cracks or fractures next to the well bores containing the electrodes.

Another object of the invention is to provide means for electrically linking one electrode to another through an oil bearing layer in such maner as to increase the drainage surface into the well bores.

Another object of the invention is to provide such an electrical linking method which also heats the oil bearing layer in the vicinity of the well bores.

Another object of the invention is to provide an electrical linking method between electrodes in an oil bearing layer which works ultimately toward linking the well bores by a crack connecting therebetween.

Another object of the invention is to provide means of electrically linking one electrode to another through an oil bearing layer in such manner as to create a physical shock adjacent the electrode carrying well bores sufficient to crack the layer in the vicinity of the well bores by physical impulse and shock waves.

Another object of the invention is to provide an electrical linking method for connecting one electrode to another through an oil bearing layer whereby to provide for a more conventional electrolinking process to be installed thereafter employing a different current and voltage pattern.

Yet another object of the invention is to provide a process for electrically linking two electrodes driven into an oil bearing layer or drive a linked path therebetween more rapidly and with less energy input than by continuous application of power at a lower voltage.

Another object of the invention is to provide an electrical linking method for electrodes in an oil bearing layer by providing methods and means of low initial cost, light weight and portable equipment, easily controlled voltage, relatively high average power output and very high peak power output.

Other and further objects will appear in the course of the following description thereof.

In the drawings, which form a part of the instant invention and are to be read in conjunction therewith, embodiments of the inventive process are shown.

*Capacitor energy storage*

Figure 1:
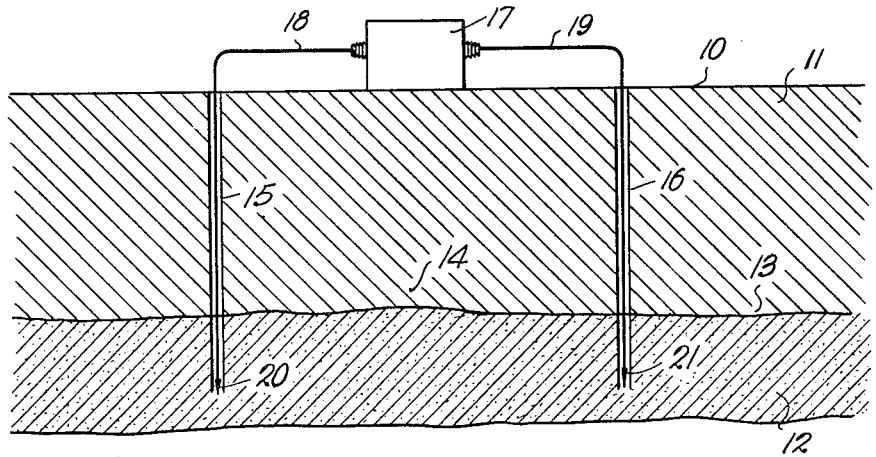
FIG. 1 is a cross-sectional view through an earth formation containing an oil horizon therein, schematically illustrating a general layout for applying high voltage surges across a pair of electrodes communicating with the oil horizon spaced from one another in separate well bores.

Referring first to FIG. 1, at 10 is generally designated the ground level of an earth formation 11 consisting of whatever geological strata may be common to the particular locale. An oil bearing layer, sand or horizon generally designated 12 has upper limit 13 defined by any typical overburden and lower boundary 14 bottomed by geological strata therebelow. A pair of well bores 15 and 16 are drilled into the oil sand or horizon to any desired level or into a relatively impermeable zone which is desired to be treated by the particular process. At 17 is generally designated a high voltage impulse generator which may comprise any one of the particular systems or circuits hereinafter particularly described. High voltage insulated conductors 18 and 19 lead from generator 17 into well bores or holes 15 and 16, respectively, passing downwardly therein to the lower extremities of the well bores. At 20 and 21 on conductors 18 and 19, respectively, are generally designated suitable electrodes contacting the oil bearing layer, oil sand or oil horizon in suitable fashion, the electrode preferably being of a sharp tipped form whereby to provide a focus of electrical flow therein. Typically, but not limiting, the well bores are spaced from 330 to 660 feet apart, depending upon the current pattern available in the system.

The object of the process is to make cracks or fractures next the well bores whereby to increase the drainage surface at the well bores and to heat the hydrocarbons in the vicinity of the well bore to decrease the viscosity of such hydrocarbons. It would be ultimately desirable to have a crack completely and continuously connecting the well bores, but such effect would be rare. The process so links one electrode to the other through the oil bearing layer by electrical impulses of a certain form as to create actual physical shocks in the oil sand from the current sufficient to crack the horizon. Such cracking is believed created by shock waves formed in the strata. By employing the instant linkage approach, a linked path is driven between two electrodes more rapidly and with less energy input than continuously applied power at a low voltage. It is also contemplated after the instant process to install a more conventional electrolinking process along the lines of Patent No. 2,795,279, supra.

High voltage surges, applied to electrolinkage, produce a linked path between two electrodes driven into an oil bearing layer more rapidly and with less energy input than continuously applied power at the lower voltages taught by Patent 2,795,279, supra. As an analogy, when a travelling wave of voltage reaches the open end of a transmission line, it is reflected and the voltage during reflection is equal to twice the surge voltage. In electro-linkage, in an installation analogous to FIG. 1, the end of the high voltage insulated conductors 18 and 19 cannot be considered as a true open circuit, but there is a definite transition at the electrodes. Partial reflection, therefore, takes place and there is a voltage rise to perhaps 1.5 times the applied surge. Thus, when a surge voltage of the order of 100 kilovolts reaches the electrodes, there would then be a rise to 150 kilovolts, more or less, and the potential gradient in the vicinity of the electrode becomes great enough to cause ionization, with accompanying carbonization, much in the same manner as tracking across plastic insulating materials. Such tracking and carbonization is started at some irregularity, burr or sharp point or corner on the conductor. This is the reason for the pointed electrodes. The carbonized track then acts as a source of high potential gradient until the path progresses completely across the insulator.

Also, as an example, in a typical example of the above-mentioned phenomena, 10 to 30 kilovolts are intermittently applied to an 8 foot long piece of "Larass" tubing. Tracking started at one end from a small irregularity on a copper fitting. The tracking progressed, in a zigzag path much as lightning stroke, along the entire length of the tubing. The path measured approximately ⅛ inch by 1/16 inch in cross section.

Figure 2:
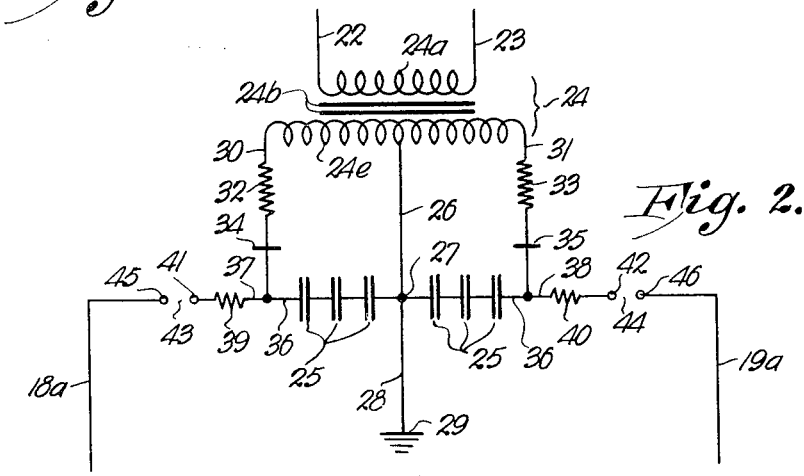
FIG. 2 is a schematic diagram of a first form of energy storage and discharge circuit applicable in the installation of FIG. 1.

Referring to FIG. 2, A.C. power input lines 22 and 23 pass to conventional high voltage transformer generally indicated at 24. Transformer 24 has input winding 24a, core 24b and output winding 24e. Capacitors 25 are linked in series to provide a capacitor bank. The center of the output winding 24e of the transformer is tied through the center of the capacitor bank by line 26 connecting to the bank at 27 and then passing by line 28 to ground 29. The ends of the output winding of the transformer by lines 30 and 31 pass through charging resistors 32 and 33, respectively, to high voltage rectifiers generally designated at 34 and 35, from whence lines 30 and 31 pass to connect with the ends of the capacitor bank. Line 36 is the series conductor for the capacitor bank and joins lines 30 and 31 in individual output lines 37 and 38. Discharge limiting resistors 39 and 40 are positioned on lines 37 and 38 which each terminate in one pole 41 and 42 of calibrated spark gaps 43 and 44. The other poles 45 and 46 of gaps 43 and 44 are connected to insulated conductors designated here as 18a and 19a to indicate their relationship to conductors 18 and 19 of the generalized system of FIG. 1.

The function of the circuit of FIG. 2 will now be described.

The transformer 24 charges capacitors 25 to a high direct current voltage through high voltage rectifiers 34 and 35. The charging rate is governed by the current or discharge limiting resistors 39 and 40, which determine the total power reaching the electrodes. Since the voltage across the capacitors may go to near zero after each impulse, resistors 39 and 40 also serve to protect the rectifiers from burning out from an overcurrent.

A typical impulse cycle can be described as follows:

(1) The voltage starts at zero, the charging current is high and the voltage builds up on the capacitors 25;

(2) The voltage increases to near the rating of the system (transformer, rectifiers, resistors and capacitors);

(3) The calibrated spark gaps 43 and 44 break down. Since the voltage appearing across an area is small because of the ionization, most of the voltage will appear across a part of the oil bearing layer. The current density in the vicinity of the electrode tips will be quite high;

(4) The behavior of an impulse voltage discharge is not the same as for continuously applied voltages as in Patent 2,795,279; thus the path through the oil bearing layer will be similar to a lightning stroke;

(5) The "leader" will travel a short distance through the oil, carbonizing it. It will be limited by the resistance of the balance of the oil bearing layer which is in series with it, the voltage applied, the energy stored in the capacitors and the nature of the material it penetrates;

(6) Many kilowatts are dissipated during the impulse;

(7) With the capacitors now discharged, the recharge cycle begins automatically;

(8) The voltage again builds up until the next discharge, which carries the "leader" a little further from the electrodes. The "leader" may begin at one or both electrodes.

A typical working voltage is in the neighborhood of 100 kilovolts. In case of an insulation failure or in the situation of an unusually low resistance from electrode to electrode, it may be necessary to limit the discharge current from the capacitors. The emplacement of a resistor of the order of 20 ohms or an air core reactor of several turns should be adequate for limiting surge currents in these situations.

Referring to the number and type of capacitors to be used, the amount of energy to be discharged depends on the number of capacitors in the bank. In a case where 40 capacitors of 20 kilovolts with 100 Joules storage each are used, eight series strings of five each would give a 100 kilovolt bank with 40,000 Joules storage. A two-second charging time would produce a 20 kilowatt average power output and would require an input of 50 kilowatts. Such a capacitor bank would have capacitance of 8 microfarads. Assuming a 100 ohm load resistance, the time constant for discharge would be $8 \times 10^{-6} \times 100$ or 0.0008 second (neglecting inductance). The power dissipation during this short period would be 40,000 kilowatts.

*Magnetic field storage*

From an energy storage standpoint, a capacitor is much superior to an inductor. A capacitor bank capable of storing 800 to 1000 watt-seconds of energy at 10 to 20 kilovolts costs approximately $250 and occupies less than one-half cubic foot. On the other hand, an inductor with a comparable storage capacity would be approximately the size of a 100 k.v.a. transformer and would cost $1500.

Figure 3:
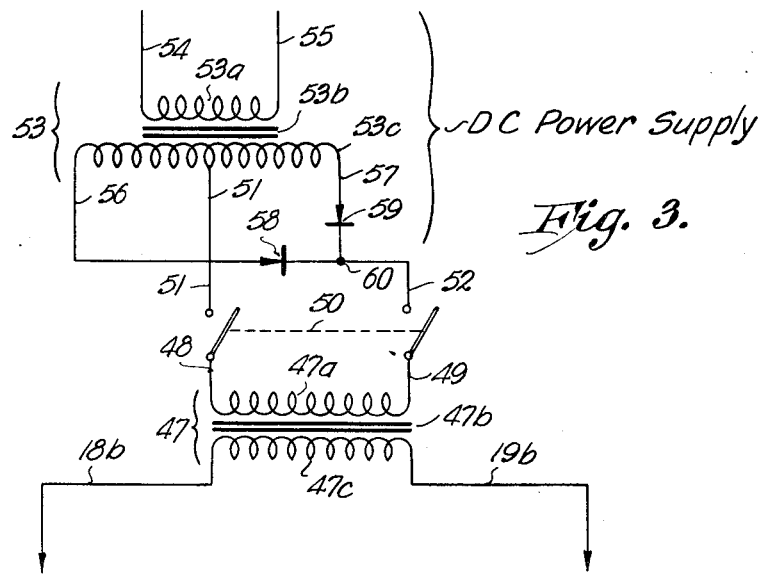
FIG. 3 is a schematic diagram of a second type of high voltage energy storage and discharge circuit for application in the installation of FIG. 1, this modification comprising an inductor type impulse generator.

FIG. 3 is a schematic diagram of an inductor type impulse generator. Energy may be stored in the magnetic field of an inductor whereby, when the current to the primary of the inductor is interrupted by a switch, a high voltage is generated in the secondary. The equivalent current continues to flow through the load resistance until the stored energy is dissipated. The energy which can be stored in an inductor the same size as a 25 k.v.a. distribution transformer is about 150 watt-seconds, and with four impulses per second an average power of about 600 watts can be delivered. A power supply having 10 k.v.a. capacity would be required.

In FIG. 3, a high voltage transformer generally designated 47 has a primary winding 47a, a core 47b and a secondary winding 47c. The ends of the secondary winding 47c are connected to insulated conductors designated 18b and 19b, respectively, to indicate their relationship to lines 18 and 19 in FIG. 1. The input lines 48 and 49 to the primary winding 47a are connected through switch 50 to output lines 51 and 52 of a direct current power supply analogous to that of FIG. 1 as illustrated. Switch 50 may be a vacuum switch for long life at high voltages, if desired.

The D.C. power supply comprises a transformer 53 having primary winding 53a fed from an A.C. power source through lines 54 and 55, core 53b and secondary winding 53c. Lines 56 and 57 having high voltage rectifiers 58 and 59 thereon join at 60 with the connection to line 52, while line 51 is connected to the center of the secondary winding 53c.

Ferroresonant generator

Figure 4:
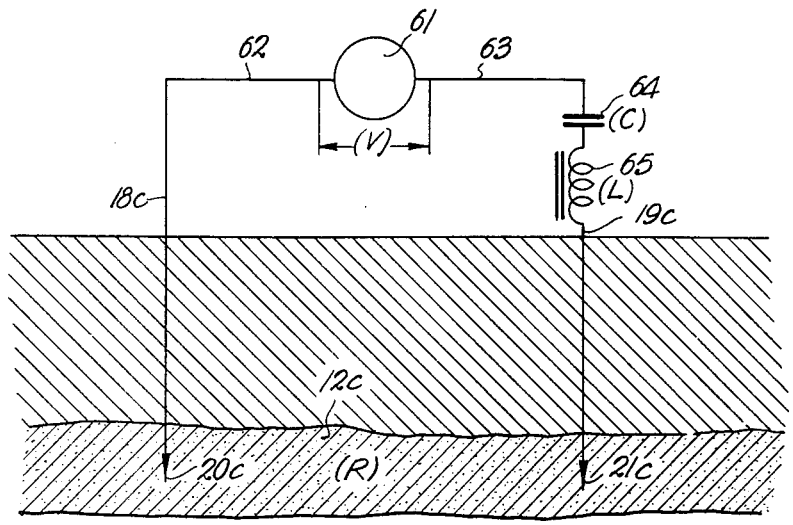
FIG. 4 is a schematic diagram of a third form of high energy storage and discharge circuit adapted for application in the installation of FIG. 1, the modification comprising a ferro-resonant generator.

In FIG. 4 is shown a ferroresonant application of energy to the oil bearing layer. A.C. power source 61 has output lines 62 and 63 connected to high voltage insulated lines 18c and 19c. Positioned in line 63 before connection to line 19c are capacitor 64 and inductance 65. The oil sand designated 12c has a particular resistance designated R to any particular positioning of the electrodes 20c and 21c.

When a critical voltage is reached, L and C go into a ferroresonance determined by R. If R is high, a slight drop in V (the output voltage from the A.C. power source) will cause ferroresonance to stop. A still higher R will prevent ferroresonance altogether. Beyond this, further reductions in R still maintain approximately the same current regardless of R, but V must be reduced a significant amount to stop ferroresonance.

This application of nonlinear circuits may be quite advantageous if R also has variations. The ferroresonant current can be controlled by changing capacitance C and the voltage by changing taps in inductance L. Thus, actually, a nonlinear self-oscillator is provided which gives significant amounts of voltages at harmonics up to the twentieth.

Peaking transformer

Figure 5:
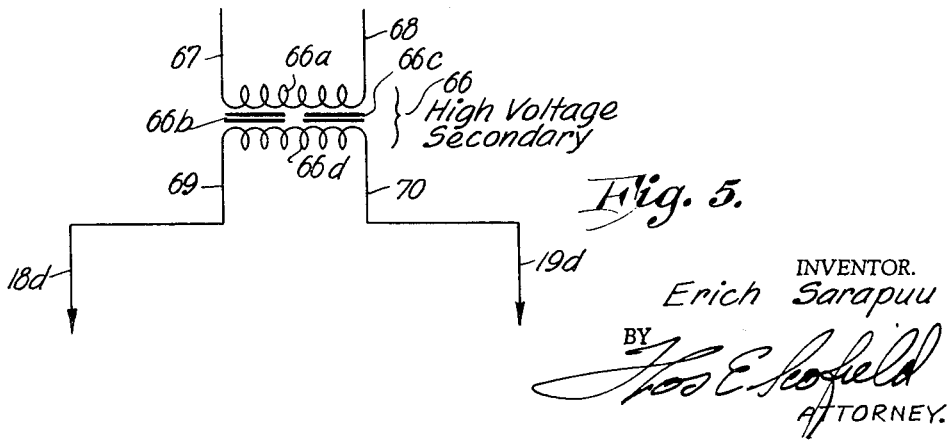
FIG. 5 is a schematic diagram of a fourth type of high energy storage and discharge device applicable in the installation of FIG. 1, the modification shown comprising a peaking transformer circuit capable of delivering a pulsed type wave form.
Figure 6:
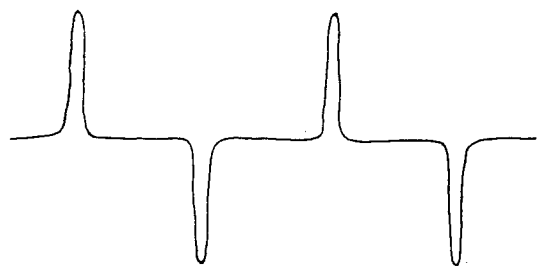
FIG. 6 is a schematic showing of a wave form output produced by the circuit of FIG. 5.

Referring to FIG. 5, therein is shown a peaking transformer circuit capable of delivering the pulsed type wave form shown in FIG. 6 to the electrodes. This circuit is somewhat more efficient than the magnetic storage of energy disclosed in FIG. 3. The current which is supplied to the primary of the transformer is at about 10 percent power factor and a large size generator must be used. The voltages generated will be somewhat lower than for capacitor energy storage as in FIG. 2 but the total energies supplied can be somewhat greater.

Referring to FIG. 5, at 66 is generally designated the peaking transformer having primary winding 66a, cores 66b and 66c and high voltage secondary winding 66d. Input lines 67 and 68 to the primary winding 66a communicate with a conventional A.C. power source (not shown). Lines 69 and 70 from the high voltage secondary winding communicate with lines 18d and 19d connecting to electrodes 20d and 21d in the oil sand (not shown).

Radio frequency energy

Radio frequency energy at high voltages, which will produce more ionization at the same potential gradient has been considered for electrolinking. The ionization level at the same potential gradient would ostensibly make it look attractive. However, it is necessary to use a frequency with one-half wave length (or greater) between the electrodes, five megacycles (or below) at 100 foot electrode spacing. The impedance of the large loop would prevent efficient application of frequencies above about 50 kilocycles and, also, the FCC would object to radiated waves at the higher frequencies. It is also expensive to build a stable high-power source at the higher frequencies. This is not considered a practical approach except in laboratory-sized experiments.

From the foregoing it will be seen that this invention is one well adapted to attain all of the ends and objects hereinabove set forth together with other advantages which are obvious and which are inherent to the process.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A process of linking underground electrodes contacting a single oil bearing earth formation comprising running a pair of well bores into the earth formation, connecting a pair of current concentrating electrodes into the earth formation in spaced relationship to one another, connecting a high voltage impulse generator to said electrodes, and applying a sufficient number of sequential high voltage and high energy electrical impulses to said electrodes that such physical shocks are produced in the earth formation next said electrodes as are sufficient to crack substantially the earth formation thereat the voltage of said impulses of the order of 150 kilovolts.

2. A process of linking underground electrodes contacting an oil bearing earth formation comprising sequentially applying sufficiently high voltage and high energy electrical surge currents across a pair of electrodes communicating with the earth formation and spaced from one another therein that such physical shocks are produced at the electrodes in the earth formation as to create substantial cracks in the earth formation thereat also the voltage of said surge currents of the order of 150 kilovolts.

3. A process as in claim 2 wherein the electrodes are point electrodes.

4. A process as in claim 2 wherein the high voltage and energy surge currents are created and discharged from a capacitor bank through a calibrated spark gap.

5. A process of linking an electrode positioned in the wellbore opposite an oil bearing layer in an earth formation with another electrode positioned within said earth formation comprising sequentially interlinking said electrodes in said earth formation by applying thereto electrical impulses of sufficiently high voltage and energy that actual physical shocks to the earth formation at the electrodes accompany the application of said electrical impulses thereto, said shocks of sufficient impulse and energy that cracks and fractures of sufficient magnitude to markedly increase the wellbore drainage area are produced in the wellbore wall the voltage of said impulses of the order of 150 kilovolts.

6. A process as in claim 5 wherein the high voltage electrical impulses are created and discharged from a capacitor bank through a calibrated spark gap.

7. A process of linking an electrode positioned in a wellbore opposite an oil bearing layer in an earth formation with another electrode positioned within said earth formation comprising sequentially interlinking said electrodes in said earth formation by applying thereto electrical impulses of sufficiently high voltage and energy that lightning-like impulses pass from the electrodes into the earth formation whereby to create actual physical shocks at said electrodes, said shocks of sufficient impulse and energy that cracks and fractures of sufficient magnitude to markedly increase the wellbore drainage area are produced in the wellbore wall the voltage of said impulses of the order of 150 kilovolts.

8. A process of linking a pair of electrodes positioned in separate wellbores communicating to a single oil sand spaced from one another in said oil sand comprising sequentially applying to said electrodes electrical impulses of sufficiently high voltage and energy that lightning-like electrical impulses pass from said electrodes into said earth formations whereby to apply actual physical shocks to the oil sand at said electrodes, said shocks of sufficient impulse and energy that cracks and fractures of sufficient magnitude to markedly increase the wellbore drainage area are produced in the wellbore wall the voltage of said impulses of the order of 150 kilovolts.

9. A process of linking underground electrodes contacting an oil bearing earth formation comprising sequentially applying sufficiently high voltage and high energy electrical surge currents across a pair of electrodes communicating with the earth formation and spaced from one another therein that such physical shocks are produced at the electrodes in the earth formation as to create substantial cracks in the earth formation thereat also, said high voltage and energy surge currents created in and discharged from a self-oscillating ferroresonant circuit, the voltages of such surge currents of the order of 150 kilovolts.

10. A process of linking underground electrodes contacting an oil bearing earth formation comprising sequentially applying sufficiently high voltage and high energy electrical surge currents across a pair of electrodes communicating with the earth formation and spaced from one another therein that such physical shocks are produced at the electrodes in the earth formation as to create substantial cracks in the earth formation thereat also, the high voltage and energy surge currents created in and discharged from a peaking transformer, the voltages of said surge currents of the order of 150 kilovolts.

References Cited in the file of this patent

UNITED STATES PATENTS

| | | |
|---|---|---|
| 1,372,743 | Gardner | Mar. 29, 1921 |
| 2,795,279 | Sarapuu | July 11, 1957 |
| 2,799,641 | Bell | July 16, 1957 |
| 2,953,742 | Herbold | Sept. 20, 1960 |